July 26, 1960 G. SCHOHAN 2,946,946

TRANSIENT-CONTROLLED MAGNETIC AMPLIFIER

Filed July 12, 1957

4 Sheets-Sheet 1

INVENTOR.
GEORGE SCHOHAN

BY [signature]
[signature]

ATTYS.

July 26, 1960 G. SCHOHAN 2,946,946

TRANSIENT-CONTROLLED MAGNETIC AMPLIFIER

Filed July 12, 1957 4 Sheets-Sheet 2

INVENTOR.
GEORGE SCHOHAN

BY C. D. O'Brien
W. O. Quesenberry

ATTYS.

July 26, 1960 G. SCHOHAN 2,946,946

TRANSIENT-CONTROLLED MAGNETIC AMPLIFIER

Filed July 12, 1957 4 Sheets-Sheet 3

INVENTOR.
GEORGE SCHOHAN

BY [signature]
[signature]

ATTYS

July 26, 1960 G. SCHOHAN 2,946,946

TRANSIENT-CONTROLLED MAGNETIC AMPLIFIER

Filed July 12, 1957 4 Sheets-Sheet 4

INVENTOR.
GEORGE SCHOHAN

BY [signature]
[signature]
ATTYS.

United States Patent Office 2,946,946

Patented July 26, 1960

2,946,946

TRANSIENT-CONTROLLED MAGNETIC AMPLIFIER

George Schohan, Washington, D.C., assignor to the United States of America as represented by the Secretary of the Navy Filed July 12, 1957, Ser. No. 671,676

14 Claims. (Cl. 323—89)

(Granted under Title 35, U.S. Code (1952), sec. 266)

The invention described herein may be manufactured and used by or for the Government of the United States of America for governmental purposes without the payment of any royalties thereon or therefor.

The present invention relates generally to half-wave bridge magnetic amplifiers and more particularly to half-wave bridge magnetic amplifiers in which the firing angle of the cores are controlled so as to develop transient currents which provide positive magnetic feedback and negative electric feedback.

It is common knowledge in the magnetic amplifier art that, in order to suppress the development through transformation of undesirable circulating currents in the control circuit during the power half-cycles, the control circuit requires a high impedance condition during the power half-cycles. It has been conventional practice heretofore to include a high series control resistor in the control circuit to provide this required high impedance during the power half-cycles; but, due to dissipation of control current in the series resistor during the control half-cycles, the provision of a series control resistor has not proved to be entirely satisfactory since several stages of amplification are required to compensate for the loss of control current in this resistor.

In the copending application of Joseph J. Suozzi, Serial No. 671,673, filed July 12, 1957, is described a biased-rectifier technique which avoids the use of a series control resistor in half-wave bridge magnetic amplifiers. In accordance with this technique, the control windings are connected in series circuit relation with the rectifiers of the reset circuit, the rectifiers being in polarity opposition in the series circuit relation. In this manner, at least one of the reset-circuit rectifiers presents a high back impedance to the control source and to any currents induced in the control windings from the load windings during the power half-cycles thereby preventing circulating currents since the rectifiers are non-conductive during the power half-cycles. Therefore, the control source is isolated from the amplifier during the power half-cycles; on the reset half-cycles, the reset circuit rectifiers are conductive and become negligible impedance devices, thereby enabling the control signal to be fully impressed across the control windings.

Although this technique is successful in eliminating undesirable circulating currents in the control circuit and provides an amplification factor of three to four over conventional magnetic bridge amplifiers, this technique relies on use of core material having rectangular hysteresis loop characteristics. The disadvantage of such core material is that it has a zero-impedance condition during the control half-cycles and causes disproportionately large control currents to flow. One apparent manner of overcoming this would be to increase the number of control turns. However, since the gain obtainable is approximated by the ratio, $$\frac{\text{control turns}}{\text{power turns}}$$

a reduction in gain occurs with an increase in control turns.

The general purpose of this invention is to prevent the occurrence of disproportionate control circuit current and to provide additional circuitry to so enhance this advantage as to result in a half-wave bridge magnetic amplifier which has an amplification factor of about twenty over conventional circuits of such type.

In accordance with the basic embodiment of the present invention, the development of disproportionate control current is prevented by the utilization of core material having a curvilinear hysteresis loop characteristic (squareness ratio less than one) instead of a rectangular hysteresis material. The additional circuitry includes a capacitor in shunt with the amplifier load and a resistor in series between the A.C. power supply and the amplifier, the parameters of the resistor and capacitor being so selected that firing initiation of one reactor in the amplifier occurs upon current dissipation in the other reactor. The effect of this action results in a potential build-up in the capacitor which discharges, during the reset half-cycle, a transient current providing positive magnetic feedback and a transient current providing negative electric feedback. The positive magnetic feedback aids the control action and thus increases the gain of the amplifier; whereas the negative electric feedback opposes the control current and results in a "self-balancing" action, which is generally desired in magnetic amplifier designs. The concept of "self-balancing" action in magnetic amplifiers was introduced in the art by W. A. Geyger, U.S. Patent 2,700,130, the manner of attaining "self-balancing" therein being different and wholly unrelated from that of the present invention.

The basic embodiment of the invention may be improved upon by providing a tachometer for applying damping feedback. In addition, an R-C integrator may be employed to overcome any undesirable dynamic-velocity characteristics caused by the tachometer. The tachometer is connected in series with the control source and control windings to provide damping; whereas, the integrator may be connected in series with the control source.

With the foregoing in mind, it is an object of the present invention to provide a new and improved half-wave bridge magnetic amplifier having improved gain.

Another object is the provision of a magnetic amplifier which is free from undesirable circulating currents in the control circuit and free from development of disproportionate control currents.

A further object is to provide a magnetic amplifier in which the gain thereof is enhanced by transient currents developed therewithin during the operation thereof.

An essential object of the invention is to provide, in a dual-reactor half-wave bridge magnetic amplifier, a firing angle determining network causing firing initiation of one reactor upon current dissipation of the other reactor.

A primary object is to develop within a magnetic amplifier transient current which supply positive magnetic feedback and negative electric feedback.

A specific object is the utilization of curvilinear hysteresis core material in a magnetic amplifier in which the bias-circuit rectifiers are included in the control circuit in series circuit relation with the control windings.

Another object of the invention is the utilization, in a magnetic amplifier, of curvilinear core material in conjunction with biased rectifiers in the control circuit and a firing angle determining network for developing transient currents in the amplifier.

Other objects and many of the attendant advantages of this invention will be readily appreciated as the same becomes better understood by reference to the following detailed description when considered in connection with the accompanying drawings in which the reference characters designate like parts throughout the figures thereof and wherein.

Figure 1:
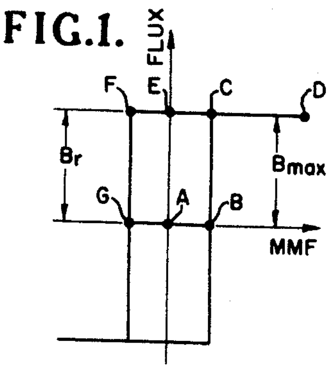
Fig. 1 is the characteristic of a magnetic material having a rectangular hysteresis loop.

In order to more fully appreciate the significance of the use of curvilinear hysteresis loop core material in the circuits of the present invention, reference is now made to Fig. 1 which is a rectangular hysteresis loop characteristic of core materials, such as Orthonal, generally used as the core reactors in magnetic amplifiers. The vertical portion of this loop represents the unsaturated or high impedance state of the core material, while the horizontal portion represents the zero-impedance state. The width of the loop is a measure of the magnetizing ampere-turns required or the core permeability. It is to be noted that the ratio of residual flux density to maximum flux density $$\left(\frac{B_r}{B_{max}}\right)$$

is equal to one. During the power half-cycle of an amplifier utilizing this material, the flux-operating point moves in the path A—B—C—D—E. In order to establish control, magnetizing ampere-turns represented by the distance E—F must first be supplied both by the control source and by the reset circuit. However, since the core is in the zero-impedance state during this time, control currents disproportionately larger flow during this period and introduce errors in the amplifier output.

Figure 2:
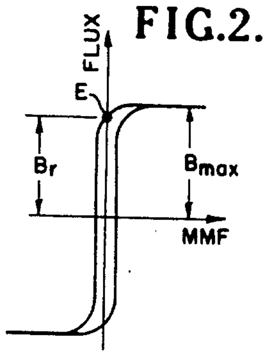
Fig. 2 is the hysteresis loop characteristic of a magnetic material of which the squareness ratio is less than one.

Referring to the curvilinear hysteresis loop of Fig. 2, which is drawn to scale with that of Fig. 1, it is to be noted that it has a narrower hysteresis loop than the rectangular hysteresis loop. This signifies that the magnetizing ampere-turns required are less, thus reducing appreciably the current in the control circuit while control is being established. This action enhances the "self-balancing" feature subsequently to be described in connection with the schematic diagram of Fig. 3.

A second important characteristic of Fig. 2 is the core state after removal of magnetizing and saturating force. When this occurs, the flux-operating point is at E which represents a less saturated core condition and a much higher impedance core-state than corresponding point E of Fig. 1. Since control is being established while the flux-operating point is at point E, it is seen that the core material of Fig. 2 is presenting an appreciable impedance to the control signal and hence prevents the development of a disproportionate control current.

It is to be noted that in Fig. 2, the ratio $$\frac{B_r}{B_{max}}$$

is less than one. Wherein here stated, the expression "curvilinear hysteresis loop characteristic" is to be construed as the characteristic of a loop having a $$\frac{B_r}{B_{max}}$$

ratio less than one. Known magnetic materials which have this characteristic are Supermalloy, Hi-Mu 80, Alfenol, Thermenol, Mu-metal, and Molypermalloy.

Figure 3:
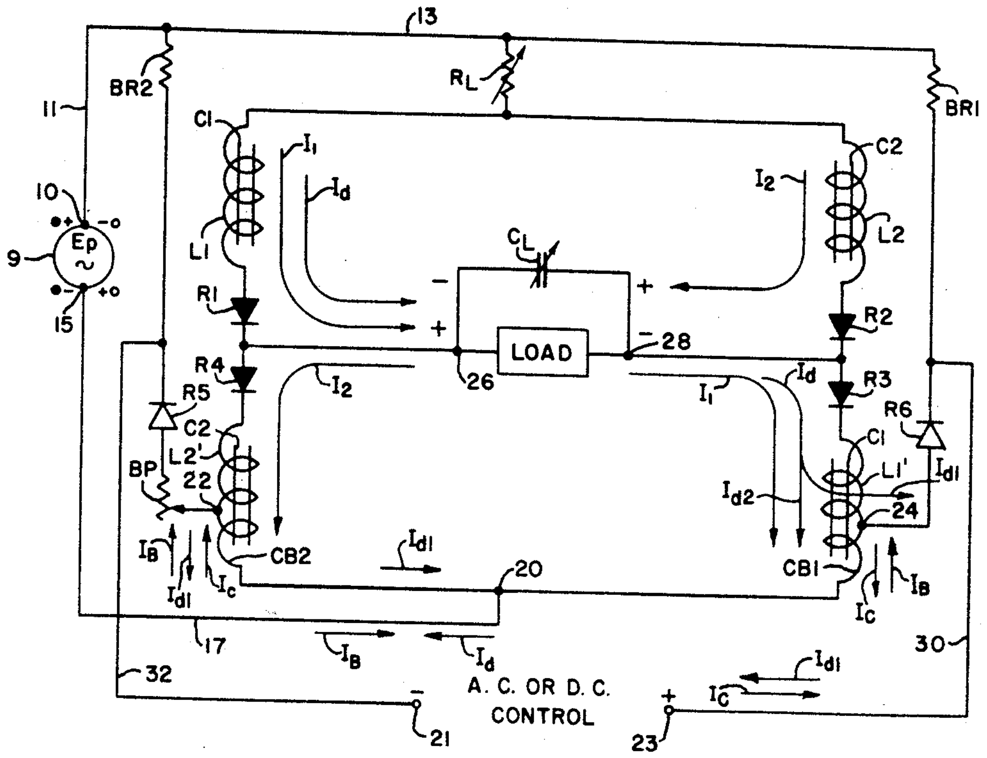
Fig. 3 is a schematic diagram of a half-wave bridge magnetic amplifier employing the biased-rectifier technique and the transient current developing network, in accordance with a basic embodiment of the invention.

With reference to Fig. 3, which illustrates a basic embodiment of the invention, an A.C. power supply source 9, such for example as a 60 c.p.s. or 400 c.p.s. source as conventionally used in servo systems, is connected through a line resistor $R_L$ to energize a half-wave magnetic bridge consisting of core reactors C1 and C2 with load windings L1, L1[1] and L2, L2[1] wound respectively thereon and rectifiers R1, R2, R3 and R4 which are preferably of the silicon diode or germanium type and which are similarly poled to pass current through the load windings on the alternate half-cycles of source 9 when terminal 10 is positive. The graphical symbols are presented in the manner shown to indicate that the black rectifiers are conducting for the black polarities of source 9, hereinafter referred to as the positive half-cycles of source 9; while the white rectifiers conduct during the white polarities thereof, hereinafter referred to as the negative half-cycles of source 9.

This circuit utilizes a portion, indicated by CB1 and CB2, of load windings L1[1] and L2[1], respectively, to serve as common bias and control windings. The reset, or bias, circuit for core C2 consists of winding CB2, balancing potentiometer BP, rectifier R5, and bias resistor BR2; while the reset circuit for core C1 includes winding CB1, rectifier R5, and bias resistor BR1. The potentiometer BP serves to compensate for dissimilarities of components in the reset circuits and provides a balanced condition. Rectifiers R5 and R6 preferably are of the type having a lower current rating than rectifiers R1 to R4 but may be of the same type. A control source, either phase-reversible D.C. or A.C., is connected across input terminals 21 and 23 to supply a control signal through leads 30 and 32 to windings CB1 and CB2 only when rectifiers R5 and R6 are conductive, as will become more apparent hereinafter. The control circuit may be traced from terminal 23, lead 30, rectifier R6, windings CB1 and CB2, resistor BP, rectifier R5 and through lead 32 to terminal 21. It is apparent that rectifiers R5 and R6 are in series circuit relation with windings CB1 and CB2 and are in polarity opposition in the series circuit relation. A load circuit is connected across the output terminals of the bridge and is shunted by a capacitor $C_L$. The values of resistor $R_L$ and capacitor $C_L$ are selected so that firing initiation of one core (core C2 for example) occurs upon current dissipation in core C1.

In operation and for the moment disregarding the functions of line resistor $R_L$ and load capacitor $C_L$, during the power half-cycles (black polarities) current flows through the load windings of the bridge in a manner depending on the unbalance thereof caused by the control signal during the preceding half-cycles to produce an output in the load. On the power half-cycles, rectifiers R5 and R6 are non-conductive; and, due to being in polarity opposition in the control circuit, at least one of these rectifiers presents a high back impedance thereby isolating the control source from the amplifier and preventing undesirable circulating currents.

During the reset half-cycles, reset current $I_B$ flows from terminal 15 of source 9 through winding CB1 and rectifier R6 in one branch and winding CB2 and rectifier R5 in the other branch. Upon conduction, rectifiers R5 and R6 become negligible impedance devices and permit the control signal to be fully applied to the control windings. Also, due to the curvilinear type of core material used, the flux condition of cores C1 and C2 at the beginning of the reset half-cycle is at point E of Fig. 2; and, consequently the cores present a high impedance which prevents the development of disproportionate control current in the control circuit. The control current flow is from terminal 23 through lead 30, rectifier R6, windings CB1 and CB2, BP, and rectifier R5 through lead 32 to terminal 21. It is to be noted that control current $I_C$ opposes bias current $I_B$ through winding CB1 of core C1 and aids bias current through winding CB2 of core C2. The arrowed current lines indicate only direction of current flow and are not representative of the current magnitudes.

Considering the effects of $R_L$ and $C_L$, application of a control signal $I_C$ of polarity shown (positive at terminal 23) opposes the reset action of core C1, and this core will fire first during the power half-cycles (positive half-cycles of source 9) with a current component $I_1$ flowing through load windings L1 and L1[1] and the load, as indicated in Fig. 3. Flow of current $I_1$ through the load institutes a D.C. transient which initially charges load capacitor $C_L$ so as to be positive at terminal 26, as shown. Since $C_L$ and $R_L$ have been adjusted so that current $I_1$ is zero prior to firing of core C2 (as shown by $I_1$ in waveform (*a*) of Fig. 4), the flux operating point of core C1 is at point E of Fig. 2 and is therefore in a high impedance state, thereby requiring volt-time area before it can again saturate.

Figure 4:
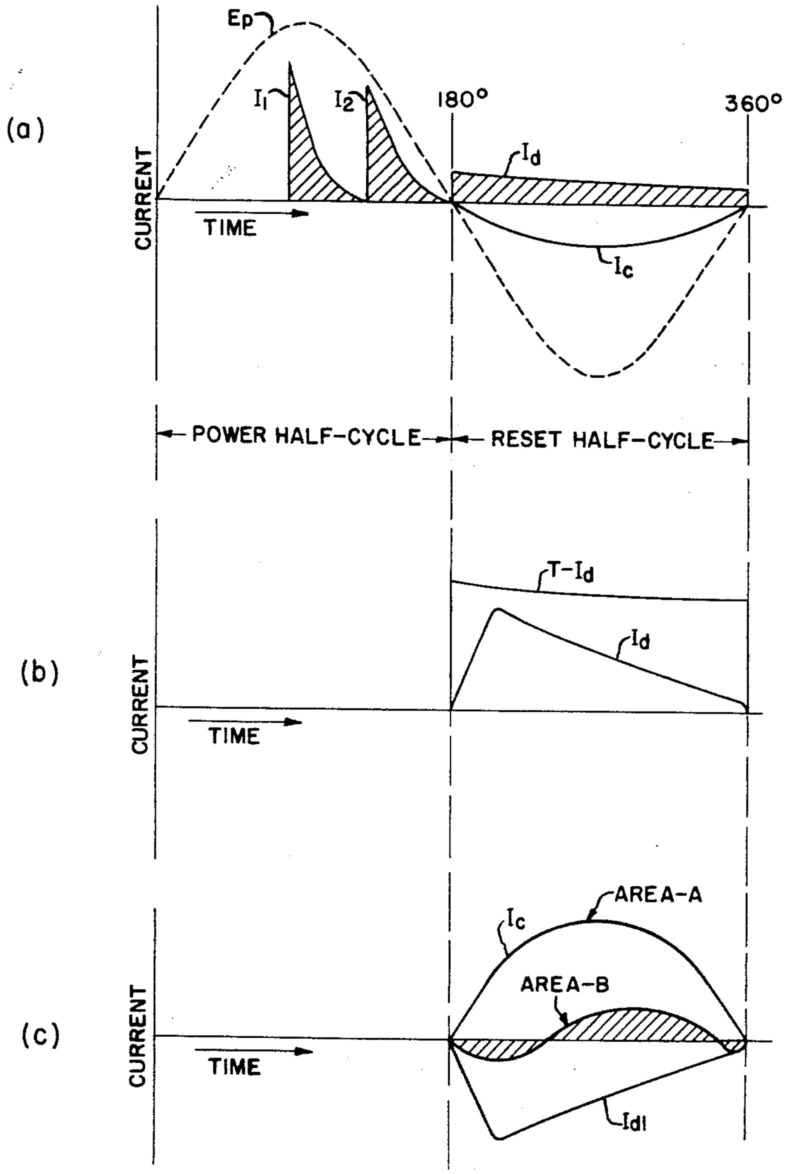
Fig. 4 represents the waveforms occuring during the operation of the circuit of Fig. 3.

When core C2 fires, the resultant load current $I_2$ finds a path only through load windings L2 and L2[1] of core C2 and is displaced in time from current $I_1$, as shown in Fig. 4(*a*). It is to be understood that the representations of current components $I_1$ and $I_2$ indicate the time relationship therebetween and not the polarity relationship, the polarity of $I_2$ actually being opposite to $I_1$ although illustrated in Fig. 4(*a*) as being of similar polarity to facilitate illustration thereof. As a result of the cross-firing effect, produced by flow of current $I_2$, the capacitor voltage across $C_L$ reverses in polarity so that at the end of the power half-cycle a charge is on capacitor $C_L$ such that terminal 28 is positive. This charge is sustained into the reset half-cycle where its leakage current flows in one path through the load windings L1[1] and L1 by way of power supply source 9 and in another path through the control circuit.

More specifically, upon initiation of the reset half-cycle (180° in Fig. 4) the charged capacitor $C_L$ begins to discharge the current $I_d$ from terminal 28 through rectifier R3 and load winding L1[1]. At tap 24 of winding L1[1], the current $I_d$ splits into two components $I_{d1}$ and $I_{d2}$, with $I_{d1}$ flowing through the control circuit via rectifier R6, lead 30, the control source, lead 32, rectifier R5, resistor BP and winding CB2 to terminal 20 where it additively rejoins current $I_{d2}$ to form current $I_d$ for conduction through lead 17. It is to be noted that, since rectifiers R5 and R6 are conductive during the reset half-cycles, these rectifiers permit current $I_{d1}$ to flow through the control circuit in the same manner as aforedescribed with respect to the control current. It is also to be noted that current component $I_{d1}$ opposes the normal flow of control current $I_e$ and therefore provides a negative electric feedback current. The negative electric feedback current $I_{d1}$ is effective to minimize the control circuit currents (as shown in waveform (*c*) of Fig. 4) so that the effective current in the control circuit, as represented by area A, is much less than the actual control current, as represented by area B, thereby establishing "self-balancing" action in the control circuit. From Fig. 4(*c*), the amplifier input-impedance level may be expressed as:

$$Z_{in}(\text{with capacitor}) = \frac{\text{area } A}{\text{area } BZ_{in}(\text{no cap.})}$$

Returning now to current component $I_d$, upon being rejoined at terminal 20 with component $I_{d1}$ the current $I_d$ flows through conductor 17, source 9, leads 11 and 13, line resistor $R_L$ and through load winding L1 and rectifier R1 to terminal 26. It is to be noted that the direction of current $I_d$ through the load windings L1 and L1[1] is such as to aid the control action of core C1 and thus provides positive magnetic feedback which increases the gain of the amplifier circuit. A further action of capacitor $C_L$ is to discharge a portion of the leakage current through the load during the reset half-cycles, which action increases the A.C. component of voltage appearing across the load. Although the leakage current of capacitor $C_L$ has a theoretical wave-shape illustrated as T–$I_d$ in wave-form (*b*) of Fig. 4, due to load and core inductance effects the actual wave-shape of the leakage current is that of $I_d$ in Fig. 4(*b*).

From the foregoing, it is apparent that use of a curvilinear-characteristic core avoids the occurrence of disproportionately large control current and that the firing angle determining network provides positive magnetic feedback and negative electric feedback to enhance the gain of the amplifier.

Design of the circuit of Fig. 3 is concentrated on obtaining the maximum gain with minimum control-circuit current. The core mean length of magnetic path should be as short as possible. Also, a high ratio of power turns to control turns is necessary for voltage gain. A preferred componential design of the circuit of Fig. 3 is as follows:

| | |
|---|---|
| Cores | 1 x 1⅜ x ⅜ in. wound 0.002 in. Supermalloy tape. |
| Rectifiers | IN93. |
| Bias resistors | 80 kilohms. |
| Each load winding | 3400 turns No. 32 wire. |
| Each control winding | 150 turns (tap at 3250 on load winding). |
| Line resistor | 100 ohms. |
| Capacitor $C_L$ | 0.77 mf. |
| Power supply | 400 c.p.s. |

For operation with a 60 c.p.s. source, it was found that improved results were obtained with a phasing capacitor connected across line resistor $R_L$ to compensate for the larger time constants under 60 c.p.s. operation.

Figure 5:
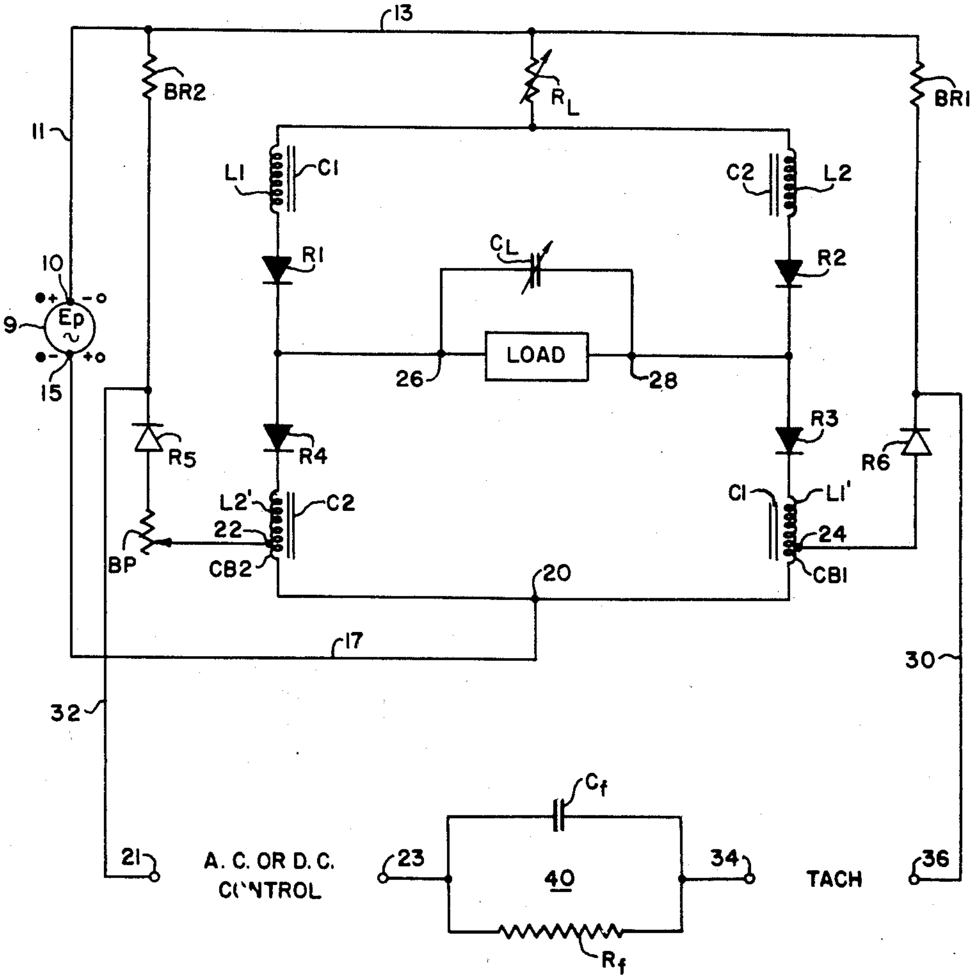
Fig. 5 is a modification of Fig. 3 and employs a tachometer for damping purpose and an integrator to improve stability.

In a preferred embodiment of the invention, damping is provided by a tachometer to improve stability and an integrator is optionally incorporated in the circuit to compensate for any deleterious effects introduced by the tachometer. Such an arrangement is shown in Fig. 5 which is identical in circuitry and operation to Fig. 3 with the exception of the tachometer and integrator, like components having corresponding reference characters. A feedback tachometer is connected across terminals 34—36 and in series with the control source.

Although use of a tachometer only satisfactory serves to provide a stable magnetic amplifier having a high amplification factor, the dynamic velocity characteristics caused by the tachometer may be considered objectionable for certain applications in high-performance serevo instrumentation. If it is desired to compensate for this objectionable dynamic velocity characteristic, an integrator indicated generally as 40 and including a resistor $R_f$ and a capacitor $C_f$ may be connected in series between the control source and the tachometer. The capacitor $C_f$ is charged by core-transformer action during the power half-cycles and is free to discharge through the control windings during the reset half-cycles to thereby compensate for any velocity error caused by the electrical characteristic of the tachometer. Also, for operation with a 60 c.p.s. power supply a phasing capacitor may be connected across the line resistor $R_L$.

A preferred componential design, compensating for use with a tachometer and integrator, of the circuit of Fig. 5 is as follows:

| | |
|---|---|
| Cores | 1 x 1⅜ x ⅜ in. wound 0.002 in. Supermalloy tape. |
| Rectifiers | IN93. |
| Bias resistors | 80 kilohms. |
| Each load winding | 3400 turns, No. 32 wire. |
| Each control winding | 225 turns (tap at 3175 on load winding). |
| Line resistor | 80 ohms. |
| Capacitor $C_L$ | 0.64 mf. |
| Integrator: | |
| Capacitor $C_f$ | 7 mf. |
| Resistor $R_f$ | 44 kilohms. |
| Power supply | 400 c.p.s. |

Figure 6:
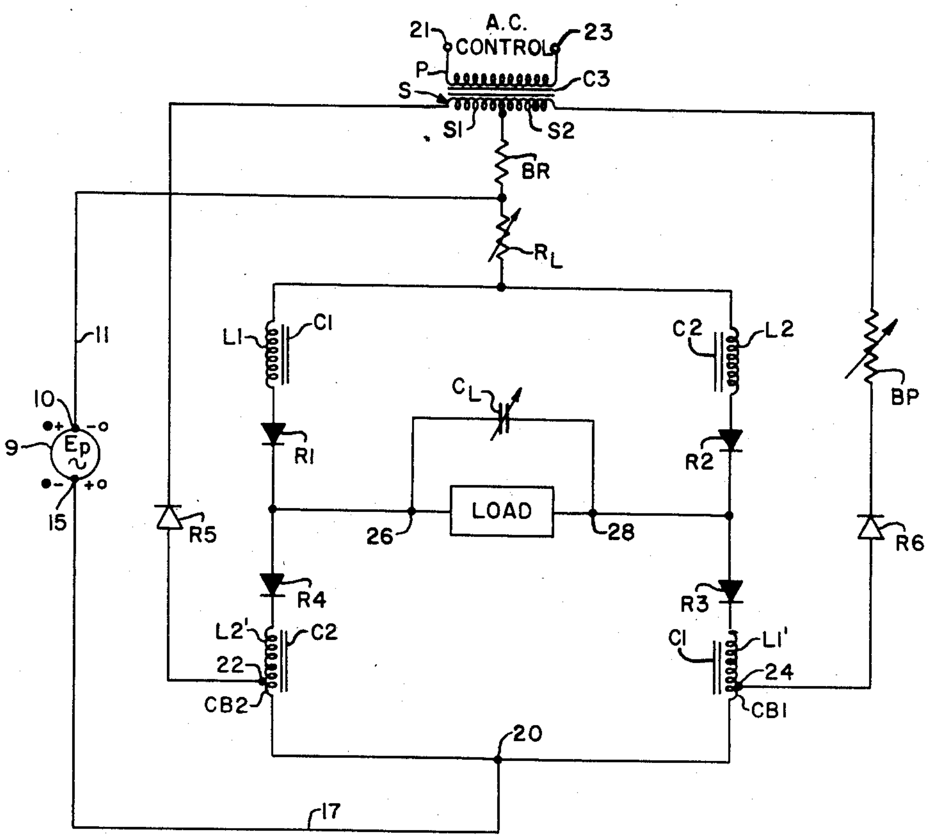
Fig. 6 is a modification of Fig. 3 and is adapted for operation from only an A.C. control signal.

The circuit of Fig. 6 is adapted for utilization only with an A.C. control signal and is the same in circuitry and operation as Fig. 3, corresponding elements having corresponding reference characters, with the exception that the control signal is applied by transformer coupling through a core reactor C3, of curvilinear hysteresis loop characteristic. The primary winding P of core C3 is connected across input terminals 21—23 for receiving the control signal. The center-tapped secondary winding S, having sections S1 and S2, is connected in the bias and control circuits. During the negative half-cycles (white polarities) of source 9, reset current flows in one path from terminal 20 through winding CB2, rectifier R5, winding section S1, bias resistor BR and back to source 9 via lead 11, and in another path from terminal 20 through winding CB1, rectifier R6, balancing potentiometer BP, winding section S2, resistor BR and lead 11 to source 9. The control circuit may be traced from section S1, rectifier R5, windings CB2 and CB1, rectifier R6, potentiometer BP and section S2, it being recalled that rectifiers R5 and R6 presenting a conductive path to the control current upon becoming conductive during the reset half-cycles. The use of core C3 is effective to eliminate the D.C. component of control circuit current.

Obviously, many modifications and variations of the present invention are possible in the light of the above teachings. It is therefore to be understood that, within the scope of the teachings herein and the appended claims, the invention may be practiced otherwise than as specifically described.

What is claimed and desired to be secured by Letters Patent of the United States is:

1. A half-wave bridge magnetic amplifier comprising a pair of supply terminals for connection to an alternating current source, a pair of output terminals connectable to a load, first and second saturable core reactors, a first inductive load winding on said first reactor and connected to a unidirectional conductive device to form one leg of the bridge, a second inductive load winding on said first reactor and connected to a unidirectional conductive device to form the bridge leg diagonally opposite said one leg, a third inductive load winding on said second reactor and connected to a unidirectional conductive device to form a third leg of the bridge, a fourth inductive load winding on said second reactor and connected to a unidirectional conductive device to form a bridge leg diagonally opposite said third leg, circuit means connecting said supply terminals across one pair of opposite terminals of said bridge and connecting said output terminals across the other pair of opposite terminals of the bridge, all of said unidirectional conductive devices being similarly poled in said bridge circuit to pass half-wave current pulses through said bridge on the same half-cycle of said source, biasing means consisting of a pair of parallel branch circuits connected across said source, one of said branch circuits serially including a rectifier and a portion of said second load winding, the other of said branch circuits serially including a rectifier and a portion of said third load winding, said rectifiers being poled to pass current from said source on the same half-cycle but during the half-cycle which said bridge is non-conductive, an input control circuit connected to receive a control signal from a control source and including in series circuit relation said rectifiers and said portions of said second and third load windings, said rectifiers being connected in polarity opposition in said series circuit relation, and a firing angle determining network comprising a resistor in series with said bridge and a capacitor across said output terminals, the parameters of said resistor and said capacitor being selected so that firing initiation of one of said reactors occurs upon current dissipation of said other reactor.

2. The magnetic amplifier of claim 1, further including a stabilizing circuit connection in said input control circuit and comprising a tachometer for providing damping currents in the amplifier.

3. The amplifier of claim 2, further including a resistance-capacitance integrator network operatively associated with said control circuit to compensate for any deleterious dynamic velocity characteristics of said tachometer.

4. The amplifier of claim 3, wherein said tachometer and said integrator network are serially included in said series circuit relation of said input control circuit.

5. The amplifier of claim 3, further including a phasing capacitor in parallel with said resistor in series with the bridge.

6. The amplifier of claim 1, wherein said control circuit includes a saturable core reactor with a primary winding and a center-tapped secondary winding thereon, said primary winding being connected to receive the control signal, said secondary winding being serially included in said series circuit relation, and each of said parallel branch circuits including a respective half of said center-tapped secondary winding.

7. A half-wave bridge magnetic amplifier comprising a pair of supply terminals for connection to an alternating current source, a pair of output terminals connectable to a load, first and second saturable core reactors having a curvilinear hysteresis loop characteristic with a squareness ratio less than one, a first inductive load winding on said first reactor and connected to a unidirectional conductive device to form one leg of the bridge, a second inductive load winding on said first reactor and connected to a unidirectional conductive device to form the bridge leg diagonally opposite said one leg, a third inductive load winding on said second reactor and connected to a unidirectional conductive device to form a third leg of the bridge, a fourth inductive load winding on said second reactor and connected to a unidirectional conductive device to form a bridge leg diagonally opposite said third leg, circuit means connecting said supply terminals across one pair of opposite terminals of said bridge and connecting said output terminals across the other pair of opposite terminals of the bridge, all of said unidirectional conductive devices being similarly poled in said bridge circuit to pass half-wave current pulses through said bridge on the same half-cycle of said source, biasing means consisting of a pair of parallel branch circuits connected across said source, one of said branch circuits serially including a rectifier and a portion of said second load winding, the other of said branch circuits serially including a rectifier and a portion of said third load winding, said rectifiers being poled to pass current from said source on the same half-cycle but during the half-cycle which said bridge is non-conductive, an input control circuit connected to receive a control signal from a control source and including in series circuit relation said rectifiers and said portions of said second and third load windings, said rectifiers being connected in polarity opposition in said series circuit relation, and a firing angle determining network comprising a resistor in series with said bridge and a capacitor across said output terminals, the parameters of said resistor and said capacitor being such that firing initiation of one of said reactors occurs upon current dissipation of said other reactor to thereby charge said capacitor upon firing of said one reactor, said charged capacitor being effective to discharge a positive magnetic feedback current through the load windings of said other reactor and a negative electric feedback current through said control circuit.

8. The magnetic amplifier of claim 7, further including a stabilizing circuit connection in said input control circuit and comprising a tachometer for providing damping currents in the amplifier and a resistance-capacitance integrator network operatively associated with said control circuit to compensate for any deleterious dynamic velocity characteristics of said tachometer.

9. The magnetic amplifier of claim 8, wherein said tachometer and said integrator network are serially included in said series circuit relation of said input control circuit.

10. The amplifier of claim 8, further including a phasing capacitor in parallel with said resistor in series with the bridge.

11. The amplifier of claim 7, wherein said control circuit includes an input saturable core reactor of curvilinear hysteresis loop characteristic with a squareness ratio less than one, a primary winding and a center-tapped secondary winding on said input reactor, said primary winding being connected to receive the control signal, and circuit connections for including said secondary winding in said series circuit relation and in conductive relation with said biasing means.

12. A half-wave bridge magnetic amplifier comprising a pair of supply terminals for connection to an alternating current source, first and second saturable core reactors with load windings thereon connected in a bridge arrangement having an opposite pair of energizing terminals and an opposite pair of output terminals, circuit means including a line resistor connecting said supply terminals across said pair of energizing terminals to thereby energize said bridge on alternate half-cycles of the alternating current source, biasing means consisting of a pair of parallel branch circuits connected across said source, each of said branch circuits including a rectifier and a portion of the load winding of a respective reactor, said rectifiers being poled to pass current from said source on the same half-cycle but during the half-cycle which said bridge is non-conductive, an input control circuit connected to receive a control signal from a control source and including in series circuit relation said rectifiers and said portions of the load windings, said rectifiers being connected in polarity opposition in said series circuit relation, and a capacitor connected across said output terminals, the parameters of said line resistor and said capacitor being such that firing initiation of one of said reactors occurs upon current dissipation of said other reactor.

13. In a half-wave bridge magnetic amplifier having a pair of reactor cores with a first pair of load windings on a first of said pair of reactor cores and a second pair of load windings on a second of said pair of reactor cores, said first and second pairs of load windings being energized from an alternating current source, a firing angle determining network comprising a resistor serially interposed between said source and bridge, and a capacitor connected in series with a first pair of rectifiers of said bridge and between said first pair of load windings, said capacitor also being connected in series with a second pair of rectifiers of said bridge and between said second pair of load windings, said resistor and capacitor being of such value as to initiate firing of one of said cores only upon current dissipation of the other of said cores.

14. A half-wave bridge magnetic amplifier comprising a pair of supply terminals for connection to an alternating current source, a pair of output terminals connectable to a load, first and second saturable core reactors having a curvilinear hysteresis loop characteristic with a squareness ratio less than one, a first inductive load winding on said first reactor and connected to a unidirectional conductive device to form one leg of the bridge, a second inductive load winding on said first reactor and connected to a unidirectional conductive device to form the bridge leg diagonally opposite said one leg, a third inductive load winding on said second reactor and connected to a unidirectional conductive device to form a third leg of the bridge, a fourth inductive load winding on said second reactor and connected to a unidirectional conductive device to form a bridge leg diagonally opposite said third leg, circuit means connecting said source across one pair of opposite terminals of said bridge and connecting said load across the other pair of opposite terminals of the bridge, all of said unidirectional conductive devices being similarly poled in said bridge circuit to pass half-wave current pulses through said bridge on the same half-cycle of said source, biasing means consisting of a pair of parallel branch circuits connected across said source, one of said branch circuits serially including a rectifier and a portion of said second load winding, the other of said branch circuits serially including a rectifier and a portion of said third load winding, said rectifiers being poled to pass current from said source on the same half-cycle but during the half-cycle which said bridge is non-conductive, and an input control circuit connected to receive a control signal from a control source and including in series circuit relation said rectifiers and said portions of said second and third load windings, said certifiers being connected in polarity opposition in said series circuit relation.

References Cited in the file of this patent

UNITED STATES PATENTS

| | | |
|---|---|---|
| 2,725,521 | Geyger | Nov. 29, 1955 |
| 2,743,407 | Geyger | Apr. 24, 1956 |

OTHER REFERENCES

"A Transient-Controlled Magnetic Amplifier," Geo. Schohan—Navord Report #4258, March 29, 1956.